United States Patent

Nagl

[11] Patent Number: 5,944,871
[45] Date of Patent: Aug. 31, 1999

[54] PROCESS FOR THE PRODUCTION OF MOLTEN PIG IRON OR STEEL PRE-PRODUCTS AND A PLANT FOR CARRYING OUT THE PROCESS

[76] Inventor: Michael Nagl, 36 Ramberg A-4204, Reichenau, Austria

[21] Appl. No.: 08/793,321
[22] PCT Filed: Jul. 18, 1996
[86] PCT No.: PCT/AT96/00128
 § 371 Date: Apr. 18, 1997
 § 102(e) Date: Apr. 18, 1997
[87] PCT Pub. No.: WO97/04136
 PCT Pub. Date: Feb. 6, 1997

[30] Foreign Application Priority Data

Jul. 19, 1995 [AT] Austria ................................. 1234/95

[51] Int. Cl.⁶ ...................................................... C21B 13/00
[52] U.S. Cl. .......................... 75/445; 266/142; 266/172
[58] Field of Search ..................................... 266/142, 143, 266/172, 182, 160; 75/445, 446, 453

[56] References Cited

U.S. PATENT DOCUMENTS

| | | |
|---|---|---|
| 3,264,096 | 8/1966 | Agarwal et al. . |
| 4,805,880 | 2/1989 | Hauk et al. ................................ 266/172 |
| 5,082,251 | 1/1992 | Whipp . |
| 5,534,046 | 7/1996 | Kepplinger et al. ........................ 75/446 |
| 5,567,379 | 10/1996 | Kepplinger et al. ....................... 266/143 |

FOREIGN PATENT DOCUMENTS

| | | |
|---|---|---|
| 0010627 | 12/1981 | European Pat. Off. . |
| 0174291 | 3/1986 | European Pat. Off. . |
| 0111176 | 5/1986 | European Pat. Off. . |
| 0217331 | 4/1987 | European Pat. Off. . |
| 0481955 | 4/1992 | European Pat. Off. . |
| 0576414 | 12/1993 | European Pat. Off. . |
| 2011742 | 3/1970 | France . |
| 1267692 | 5/1968 | Germany . |
| 2660884 | 4/1985 | Germany . |
| 1047820 | 2/1989 | Japan . |

Primary Examiner—Scott Kastler
Attorney, Agent, or Firm—Ostrolenk, Faber, Gerb & Soffen LLP

[57] ABSTRACT

In a process for the production of molten pig iron (12) or steel pre-products from fine particulate iron-containing material, in particular reduced sponge iron, in a meltdown gasifying zone (6) of a melter gasifier (5) the iron-containing material is melted in a bed (16) formed of solid carbon carriers, under the supply of carbon-containing material and oxygen-containing gas at the simultaneous formation of a reducing gas. To prevent the fine particles of the iron-containing material charged to the melter gasifier from being discharged, the iron-containing material is supplied into the a melter gasifier (5) centrally, closely above the bed (16) but in its immediate vicinity, by means of an oxygen-burner (15) under the formation of a high-temperature combustion zone (21).

15 Claims, 1 Drawing Sheet

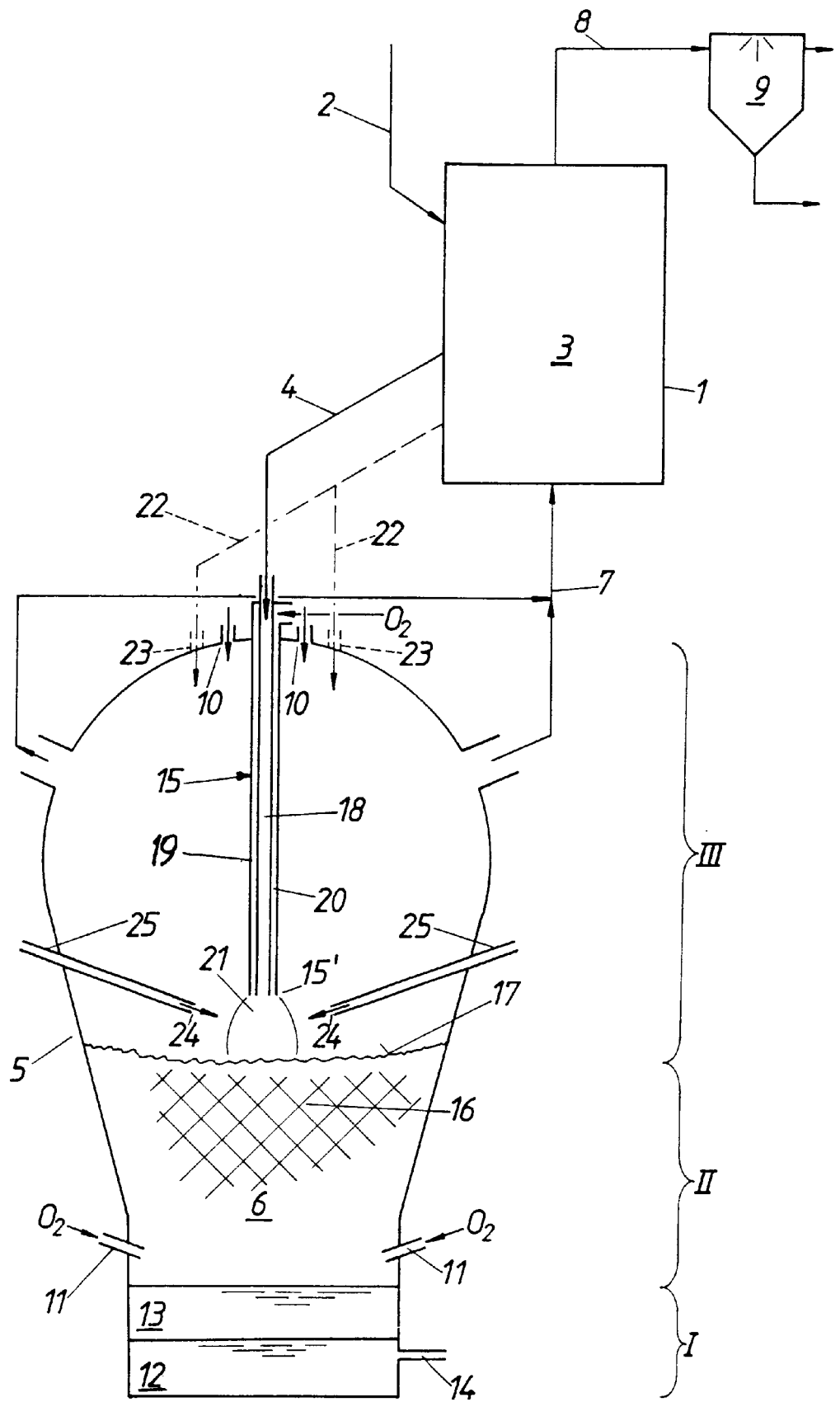

PROCESS FOR THE PRODUCTION OF MOLTEN PIG IRON OR STEEL PRE-PRODUCTS AND A PLANT FOR CARRYING OUT THE PROCESS

BACKGROUND OF THE INVENTION

The invention relates to a process for the production of molten pig iron or steel pre-products from fine-particulate iron-containing material, in particular reduced sponge iron, in a meltdown gasifying zone of a melter gasifier, in which, under the supply of carbon-containing material and oxygen-containing gas at the simultaneous formation of a reducing gas, the iron-containing material is melted in a bed formed of solid carbon carriers, optionally upon previous complete reduction, and a plant for carrying out the process.

EP-B-0 010 627 teaches a process for the production of molten pig iron or steel pre-products from particulate iron-containing material, particularly prereduced sponge iron, and for the production of reducing gas in a melter gasifier, wherein by the addition of coal and by blowing in an oxygen-containing gas a fluidized bed is formed of coke particles. Here, the oxygen-containing gas or pure oxygen respectively are injected into the lower region of the melter gasifier. The particulate iron-containing material, particularly prereduced sponge iron, and the lumpy coal are fed in from above, through charging openings arranged in the hood of the melter gasifier, the descending particles are slowed down in the fluidized bed and the iron-containing particles are reduced and melted while falling through the coke fluidized bed. The molten and slag-covered metal collects at the bottom of the melter gasifier. Metal and slag are drawn off through separate tap openings.

A process of this kind is, however, not suited for processing fine-particle sponge iron, as fine-particle sponge iron would be discharged from melter gasifier at once, due to the pronounced gas flow existing within the same. Discharging is further promoted by the temperature reigning in the upper region of the melter gasifier, since it is too low to ensure melting of the sponge iron at the charging site.

From U.S. Pat. No. 5,082,251 it is known to directly reduce iron-containing fine ore in a fluidized bed operation by means of a reducing gas produced from natural gas. In this process the fine ore, which is rich in iron, is reduced by means of a reducing gas, at elevated pressure, in a system of fluidized bed reactors arranged in series. The sponge iron powder thus obtained is subsequently subjected to hot or cold briquetting. For further processing the sponge iron powder, separate melting facilities have to be provided.

From EP-A-0 217 331 it is known to directly prereduce fine ore in a fluidized bed process and to feed the prereduced fine ore to a melter gasifier and to completely reduce it by means of a plasma burner under the supply of a carbon-containing reducing agent and to melt it. In the melter gasifier, a fluidized bed forms and thereabove a fluidized bed of coke. The prereduced fine ore or the sponge iron powder respectively are supplied to a plasma burner provided in a lower section of the melter gasifier. One disadvantage here is that by feeding the prereduced fine ore immediately in the lower melting region, i.e. in the region where the melt collects, complete reduction is no longer ensured and the chemical composition required for further processing of the pig iron cannot be achieved in any event. Moreover, charging of substantial amounts of prereduced fine ore is not feasible, due to the fluidized bed or fixed bed respectively forming from coal in the lower region of the melter gasifier, as it is not feasible to discharge a sufficient portion of the melting products from the high-temperature zone of the plasma burner. Charging of more substantial amounts of prereduced fine ore would instantly lead to thermal and mechanical failure of the plasma burner.

From EP-B-0 111 176 it is known to produce sponge iron particles and molten pig iron from lumpy iron ore, the iron ore being directly reduced in a direct-reduction aggregate and sponge iron particles discharged from the direct-reduction aggregate being separated into a coarse and fine-grain fraction. The fine-grain fraction is supplied to a melter gasifier, in which the heat required for melting the sponge iron as well as the reducing gas supplied to the direct-reduction aggregate are produced from charged coal and supplied oxygen-containing gas. The fine-grain fraction is conducted into the melter gasifier via a downpipe projecting from the head of the melter gasifier as far as into the vicinity of the fluidized bed of coal. At the end of the downpipe a baffle plate is provided in order to minimize the velocity of the fine-grain fraction, and consequently the exit velocity of the fine-grain fraction on leaving the downpipe is very low. At the charging site, the temperature reigning inside the melter gasifier is very low, as a result of which immediate melting of the supplied fine-grain fraction cannot take place. This and the low exit velocity from the downpipe lead to a substantial portion of the supplied fine-grain fraction exiting from the melter gasifier along with the reducing gas produced in the same. In accordance with this process it is not possible to charge a more substantial amount of fine grain or to charge fine grain exclusively.

In a process according to EP-A-0 576 414 lumpy iron-ore-containing charging substances are directly reduced in a reduction shaft furnace, by means of the reducing gas formed in the meltdown gasifying zone. The sponge iron thus obtained is subsequently fed to the meltdown gasifying zone. In order to be able to additionally utilize fine ore and/or ore dust, such as oxidic iron fine dust incurring in a metallurgical plant, with this known process, the fine ore and/or the ore dust along with solid carbon carriers are supplied to a dust burner working into the meltdown gasifying zone and are reacted in a substoichiometric combustion reaction. A process of this kind enables efficient processing of fine ore and/or ore dust incurring in a metallurgical plant, and that up to an order of magnitude of 20 to 30% of the total ore charge, and thus enables a combined processing of lumpy ore and fine ore.

SUMMARY OF THE INVENTION

The invention aims at avoiding these drawbacks and difficulties and has as its object to provide a process of the initially described kind and a plant for carrying out the process enabling the processing of fine-particulate iron-containing material, without any need for briquetting, and wherein on the one hand any discharge of the supplied fine particles, i.e. of the iron-containing material, optionally in the prereduced or in the completely reduced state, by means of the reducing gas produced in the melter gasifier is reliably avoided and wherein on the other hand a possibly required complete reduction is ensured. One particular object of the invention is to create a process enabling the processing of a charge the majority of which, preferably 100%, are made up of fine-particulate iron-containing material to obtain pig iron and/or steel preproducts, while utilizing a melter gasifier.

According to the invention this object is achieved in that the iron-containing material is supplied into the a melter gasifier centrally, closely above the bed but in its immediate vicinity, by means of an oxygen-burner under the formation of a high-temperature combustion zone, wherein preferably a burning jet formed in the high-temperature combustion zone is directed towards the surface of the bed and is utilized for blowing the iron-containing material towards the surface of the bed.

On the surface of the bed the velocity of the fine-particulate iron-containing material is slowed down, so that a retention time is achieved in the high-temperature zone that is sufficient for melting the supplied iron-containing material. Slag and iron can run off through the fluidized or fixed bed respectively toward the lower section of the melter gasifier. Due to the retention time ensured in the meltdown gasifying zone complete reduction of any iron-containing material not yet completely reduced at this stage is ensured.

From EP-A-0 174 291 it is known to supply dustlike sulfidic nonferrous metal ores, particularly nonferrous metal ores, to a melter gasifier via a melter-burner. Even more substantial amounts of sulfidic nonferrous metal ores can be processed here, as the heat required for melting the ore particles is produced by exothermic reaction of the sulfidic ore with oxygen in the burner.

With this known process, the coal for forming a fluidized bed of carbon is charged into the meltdown gasifying zone separately. With a process of this kind it is not feasible to oxidic fine ores, as the heat that would cause these oxidic fine ores to melt would not be available here. As a result, due to the fine ore supply duct being arranged at the upper end of the melter gasifier, these fine ores would be discharged by the reducing gas which emerges from the meltdown gasifying zone and is discharged from the melter gasifier.

To prevent the fine-particulate iron-containing material charged into the meltdown gasifying zone from being oxidized by the oxygen or oxygen-containing gas supplied to the oxygen burner, according to the invention advantageously fine coal is introduced, or preferably blown into the high-temperature combustion zone directly.

According to a preferred embodiment fine ore is reduced in the fluidized bed process by means of the reducing gas formed in the meltdown gasifying zone, wherein the reducing gas emerging from the melter gasifier is conveyed to the fluidized bed reduction directly, i.e. without prior dust separation. In the process, the coke dust discharged from the meltdown gasifying zone along with the reducing gas is fed to the fluidized bed reduction zone and thereby reduces the danger of "sticking". Along with the reduced fine ore it is subsequently fed to the meltdown gasifying zone again, via the oxygen burner, so that it will not be lost.

Advantageously lumpy carbon-containing material as well as lumpy iron-containing material, which, in view of their size, cannot be discharged along with the gas stream, are additionally introduced into the meltdown gasifying zone via supply ducts leading into the upper section of the melter gasifier. Thus with the process according to the invention conventional melter gasifiers may be employed without any major constructional changes.

A plant for carrying out the process, comprising a melter gasifier including supply and discharge ducts for adding carbon-containing material, iron-containing material, for discharging the reducing gas produced and for feeding oxygen-containing gas, as well as a slag and iron-melt tap, wherein a lower section of the melter gasifier is provided for collecting the molten pig iron and the liquid slag, a superimposed central section is provided for accommodating a bed of solid carbon carriers and subsequently an upper section is provided as a killing space, characterized in that a burner supplying an oxygen-containing gas and fine-particulate iron-containing material into the melter gasifier is provided whose burner head is arranged at the transition from the central section to the upper section in the heart of the cross section of the killing space, wherein suitably the burner head is directed towards the surface of the bed.

Preferably, lance openings of supply lances feeding fine coal are provided in the immediate vicinity of the burner head.

In accordance with a preferred embodiment the burner is designed as a burning lance protruding into the interior of the melter gasifier vertically and centrally, departing from the head of the melter gasifier. The burner may for example be constructed as described in EP-A-0 481 955. In addition it may be provided with an annular gap for simultaneously supplying solid fine-particle coal.

Suitably the supply lances protrude into the melter gasifier departing from the side, preferably slanting downward.

It is of advantage if, departing from the killing space of the melter gasifier, a reducing-gas discharge duct runs directly, i.e. with no dust separating means arranged intermediately, into a fluidized bed reactor utilized for directly reducing fine-particulate iron ore, and that departing from the fluidized bed reactor a duct for discharging reduced fine ore runs into the burner.

BRIEF DESCRIPTION OF THE DRAWING

The sole drawing FIGURE schematically illustrates an examplary embodiment of the invention.

DESCRIPTION OF THE PREFERRED EMBODIMENT

The plant according to the invention is provided with a fluidized bed reactor 1, into which iron-containing fine ore or iron-containing ore (f.i. 1461 kg ore/ton pig iron) containing a considerable portion (more than 50%) of fine ore is fed through an ore feed duct 2. In this fluidized bed reactor 1 a pre- or optionally a complete reduction of the fine ore is carried out in a fluidized bed zone 3.

Details concerning the ore:

$Fe_{tot}$ 66.3%

$Fe_2O_3$ 94.7% grain size 0 to 8 mm

Instead of the single fluidized bed reactor 1 it is feasible to provide several fluidized bed reactors consecutively arranged in series, wherein the fine ore is conducted from fluidized bed reactor to fluidized bed reactor via conveying ducts, similar to the manner described in US-A-0 5,082,251.

The pre- or completely reduced fine ore, that is to say the sponge iron powder (530 kg/ton pig iron), is supplied to a melter gasifier 5 through a conveying duct 4, in a manner that will be described in more detail below. In the melter gasifier 5, in a meltdown gasifying zone 6, a CO- and $H_2$-containing reducing gas (1715 $Nm^3$/ton pig iron at 850° C.) is produced from coal and oxygen-containing gas and is fed to the fluidized bed reactor 1 via a reducing-gas feed duct 7.

Analysis of the reducing gas:

$Co$ 63.4%

$Co_2$ 4.3%

$H_2$ 26.3% balance ($H_2O$, $N_2$, $CH_4$)

The reducing gas then streams through the fluidized bed reactor 1 in counterflow to the ore flow and is discharged from the fluidized bed reactor 1 via a top-gas discharge duct 8 and subsequently is cooled and scrubbed in a wet scrubber 9 and then is made available to consumers as a top gas (1639 Nm³/ton pig iron).
Analysis of the top gas:
Co 42%
$CO_2$ 33.2%
$H_2$ 18.4%
balance ($H_2O$, $N_2$, $CH_4$)
calorific value of the top gas: 7681 kJ/m³ normal The melter gasifier 5 is provided with supply ducts 10 for solid carbon carriers in lumpy form (700 kg lump coal/ton pig iron), supply ducts 11 for oxygen-containing gases (275 Nm³$O_2$/ton pig iron) as well as optionally supply ducts for carbon carriers, such as hydrocarbons, that are liquid or gaseous at room temperature as well as for burned fluxes.

In the melter gasifier 5, in a lower section I below the meltdown gasifying zone 6, molten pig iron 12 (1000 kg pig iron/ton pig iron) or molten steel pre-material respectively and molten slag 13 (303 kg/ton pig iron) collect, which are tapped off via a tap 14.

The average analysis of the pig iron is as follows:
C 4.3%
Si 0.4%
Mn 0.08%
P 0.1%
S 0.05%
balance (Fe)

Average slag basicity: B2 ($CaO/SiO_2$)=1.1

In a section II of the melter gasifier 5 arranged above the lower section I a bed 16 is formed from the solid carbon carriers, preferably a fixed bed and/or a fluidized bed. The upper section III provided above the central section II serves as a killing space for the reducing gas forming in the melter gasifier 5 and for solid particles entrained by the gas stream formed by the reducing gas.

The pre- or completely reduced fine ore is introduced into the meltdown gasifying zone 6 by means of an oxygen burner 15 directed downward from above and oriented approximately vertically, with the burner head 15' being positioned closely above the surface 17 of the bed 16. With respect to the cross-section of the melter gasifier 5 the burner head 15' is arranged in the central region of the same, i.e. spaced apart from the side wall of the same. Preferably only a single burner head 15' is provided, which is positioned on the vertical longitudinal center line of the melter gasifier 5. The burner 15 is provided with a central inner pipe 18 for feeding the partially or completely reduced fine ore and with an annular gap 20 for feeding oxygen (275 Nm³ $O_2$ton pig iron) or an oxygen-containing gas respectively, which surrounds the central inner pipe 18 and is delimited by a cooled outer pipe 19.

At the exit site of the oxygen-containing gas and of the supplied iron-containing material a high-temperature combustion zone 21 is formed in which the iron-containing material blown in via the burner head in the direction of the surface 17 of the bed 16, due to being slowed down on the surface 17 of the bed 16 and by impinging on the said surface 17, reaches a retention time that is sufficient for melting the iron-containing material. The slag thus formed and the molten iron can run off through the bed 16 to the lower section I of the melter gasifier 5.

It may be of advantage, particularly in case of major fluctuations in the grain size of the charged fine ore or in case a certain portion is made up of coarser ore particles, to fractionate the iron-containing material emerging from the fluidized bed reactor 1 and to feed only the fine-grain fraction to the burner 15 while charging the coarse-grain fraction (preferably 2 to 8 mm) (530 kg/ton pig iron) via a separate supply duct 22 and supply openings 23 in the upper section of the melter gasifier 5 into the same. Preferably, the grain size of the particles supplied via the burner 15 ranges from 0 to 2 mm.

Details concerning the coal:
ultimate analysis:
C 73.6%
H 4.4%
N 1.7%
O 6.2%
S 1.0%
Cfix 60.8%
volatiles 25.6%
ashes 8.6%
grain size of the fine coal:
0 to 2 mm
grain size of the lump coal:
8 to 50 mm In close vicinity of the burner head 15', lance openings 24 are positioned of supply lances 25 supplying fine coal (250 kg/ton pig iron). Thus it becomes feasible to blow fine coal into the high-temperature combustion zone 21 from the side to a level below the burner head 15', thereby making it possible to prevent oxidation of the partially or completely reduced fine ore by the oxygen supplied via the burner head 15'.

The supplied fine coal further enables a reduction in the temperature of the reducing gas formed in the meltdown gasifying zone 6, which then can be discharged like in conventional melter gasifiers.

A dust separating means becomes unnecessary for the reducing gas as well as a dust recircling means, since in the fluidized-bed reduction zone 3 of the fluidized-bed reactor 1 the coke dust discharged along with the reducing gas reduces the danger of "sticking", and thus is by no means disturbing and via the oxygen burner 15 reaches the meltdown gasifying zone 6 again. It may be advantageous, however, with a view to adjusting the temperature of the reducing gas, to purify a portion of the same and subsequently recircle it.

I claim:

1. A process for the production of molten pig iron (12) or steel pre-products from fine-particulate iron-containing material in a meltdown gasifying zone (6) of a melter gasifier (5), in which, in the presence of carbon-containing material and oxygen-containing gas at the simultaneous formation of a reducing gas, the iron-containing material is melted in a bed (16) formed of solid carbon carrier, wherein the iron-containing material is supplied into the melter gasifier (5) centrally, in the immediate vicinity above the bed, by means of an oxygen-burner (15) under the formation of a high-temperature combustion zone (21), and wherein the reducing gas formed in the melter gasifier is introduced into a fluidized bed of fine iron ore and said iron ore is reduced thereby.

2. A process according to claim 1, characterized in that a burning jet formed in the high-temperature combustion zone (21) is directed towards the surface (17) of the bed (16) and is utilized for blowing the iron-containing material towards the surface (17) of the bed (16).

3. A process according to claim 1, characterized in that fine coal is introduced into the high-temprature combustion zone (21) directly.

4. A process according to claim 1, characterized in that fine ore is reduced in the fluidized bed process (3) by means of the reducing gas formed in the meltdown gasifying zone (6), wherein the reducing gas emerging from the melter gasifier (5) is conveyed to the fluidized bed reduction (3) directly, without prior dust separation.

5. A process according to claim 1, characterized in that lumpy carbon-containing material as well as lumpy iron-containing material are additionally introduced into the meltdown gasifying zone (6) via supply ducts (10, 22, 23) leading into the upper section of the melter gasifier (5).

6. A plant for carrying out the process according to claim 1, comprising a melter gasifier (5) including supply and discharge ducts (4, 7, 10, 11) for adding carbon-containing material, iron-containing material, for discharging the reducing gas produced and for feeding oxygen-containing gas, as well as a slag and iron-melt tap (14), wherein a lower section (I) of melter gasifier (5) is provided for collecting the molten pig iron (12) and liquid slag (13), a superimposed central section (II) is provided for accommodating a bed (16) of solid carbon carriers and subsequently an upper section (III) is provided as a killing space, characterized in that a burner (15) supplying an oxygen-containing gas and fine-particulate iron-containing material into the melter gasifier (5) is provided whose burner head (15') is arranged at the transition from the central section (II) to the upper section (III) in the heart of the cross section of the killing space.

7. A plant according to claim 6, characterized in that the burner head (15') is directed towards the surface (17) of the bed (16).

8. A plant according to claim 6, characterized in that lance openings (24) of supply lances (25) feeding fine coal are provided in the immediate vicinity of the burner head (15').

9. A plant according to claim 6, characterized in that the burner (15) is designed as a burning lance protruding into the interior of the melter gasifier (5) vertically and centrally, departing from the head of the melter gasifier (5).

10. A plant according to claim 8, characterized in that the supply lances (25) protrude into the melter gasifier (5) departing from the side.

11. A plant according to claim 6, characterized in that departing from the killing space (III) of the melter gasifier (5) a reducing-gas discharge duct (7) runs directly, with no dust separating means arranged intermediately, into a fluidized bed reactor (1) utilized for directly reducing fine-particulate iron ore, and that departing from the fluidized bed reactor (1) a duct (4) for discharging reduced fine ore runs into the burner (15).

12. A process according to claim 1, wherein the particulate iron-containing material is reduced sponge iron.

13. A process according to claim 1, wherein the particulate iron-containing material is previously completely reduced.

14. A process according to claim 3, wherein the fine coal is blown into the high-temperature combustion-zone.

15. A process according to claim 10, wherein the supply lances slant downwards.

* * * * *

UNITED STATES PATENT AND TRADEMARK OFFICE
CERTIFICATE OF CORRECTION

PATENT NO.   : 5,944,871
DATED        : August 31, 1999
INVENTOR(S)  : Michael NAGL It is certified that error appears in the above-identified patent and that said Letters Patent is hereby corrected as shown below:

On the title page, insert:

--[73]   Assignees:   Voest-Alpine Industrieanlagenbau GmbH, Linz, Austria.

Pohang Iron & Steel Co., Ltd., Pohang City, Republic of South Korea.

Research Institute of Industrial Science & Technology, Pohang City, Republic of South Korea.--

Signed and Sealed this

Fourteenth Day of March, 2000

Attest:

Q. TODD DICKINSON

Attesting Officer

Commissioner of Patents and Trademarks